United States Patent [19]

Ohtombe et al.

[11] Patent Number: 4,547,896

[45] Date of Patent: Oct. 15, 1985

[54] PRINTED MATTER IDENTIFYING APPARATUS

[75] Inventors: Ko Ohtombe, Tokyo; Tsuyoshi Ishida; Hideo Osawa, both of Yokohama; Kenji Nagahashi, Kawasaki, all of Japan

[73] Assignee: Tokyo Shibaura Denki Kabushiki Kaisha, Kawasaki, Japan

[21] Appl. No.: 392,476

[22] Filed: Jun. 28, 1982

[30] Foreign Application Priority Data

Jun. 29, 1981 [JP] Japan .................................. 56-99618

[51] Int. Cl.[4] .................................................. G06K 9/26

[52] U.S. Cl. .......................................... 382/7; 250/556; 356/71; 382/17; 382/67

[58] Field of Search ................... 382/7, 17, 22, 24, 67; 356/71; 250/556, 557, 559, 571

[56] References Cited

U.S. PATENT DOCUMENTS

| | | | |
|---|---|---|---|
| 3,202,761 | 8/1965 | Bibbero | 382/1 |
| 3,469,238 | 9/1969 | Partin | 382/67 |
| 3,496,370 | 2/1970 | Haville et al. | 250/567 |
| 3,745,527 | 7/1973 | Yoshimura et al. | 382/17 |
| 3,922,090 | 11/1975 | Fain | 356/71 |
| 4,041,456 | 8/1977 | Ott et al. | 382/7 |
| 4,179,685 | 12/1979 | O'Maley | 382/7 |
| 4,183,665 | 1/1980 | Iannadrea et al. | 356/71 |

FOREIGN PATENT DOCUMENTS

| | | |
|---|---|---|
| 2824849 | 12/1979 | Fed. Rep. of Germany . |
| 2078368 | 1/1982 | United Kingdom . |

*Primary Examiner*—Leo H. Boudreau

*Attorney, Agent, or Firm*—Cushman, Darby & Cushman

[57] ABSTRACT

In a printed matter identifying apparatus of the present invention, the light source illuminates the detecting fields of the note. The reflected light-waves from the detecting fields are lead to the light receivers through the focusing lenses, the diffusion plates, the optical slits, the light conducting paths and red color transmitting and blue color transmitting filters. The output signals from the light receivers are amplified by the amplifiers and sampled by the sampling circuits. Among the sampled color component signals, the red component signals are applied to the subtracter to produce the red component difference signal and the blue component signals are applied to the adder to produce the blue component sum signal. These different signal and sum signal are applied to the comparators respectively and compared with the reference signals read out from the memory. The output signals from the comparators are supplied to the judgment circuit where the judgment of the printed matter is performed.

15 Claims, 30 Drawing Figures

PRINTED MATTER IDENTIFYING APPARATUS

BACKGROUND OF THE INVENTION

This invention relates to a discriminating apparatus for detecting the design and color features of a printed pattern such as, for example a note.

Conventionally, to detect the printed pattern of a note, the detecting field is defined by a slit S as shown in FIG. 1. The quantity of light from the detecting visual field is photoelectrically scanned, as the note is conveyed past the slit and then the photoelectric conversion signal is sampled to compare the sampling pattern with a predetermined reference pattern.

For example, when the printed pattern on the note is as shown in FIG. 1(A), the light from a to b of the detecting visual field S is photoelectrically converted to obtain a waveform shown in FIG. 2(A) and further to obtain the sampling pattern from the waveform. However, when the printed pattern as shown in FIG. 1(B) is scanned over the detecting visual field a to b, the waveform shown in FIG. 2(B) which is the same as FIG. 1(A) is obtained. Therefore, the prior art is deficient in that the patterns (A) and (B) cannot be distinguished from each other although they are obviously different from each other.

SUMMARY OF THE INVENTION

Accordingly, one object of the present invention is to provide a printed matter identifying apparatus which scans the printed pattern by dividing the pattern into a plurality of sections in a direction orthogonal to the direction of conveyance and compares the read-out signal from each section with the reference signal for many printed patterns, in order to verify the type of or authenticity of the printed matter.

To achieve the above object, a printed matter identifying apparatus is provided according to the present invention, comprising:

conveying means for conveying printed matter through a lighted conveying path in a predetermined direction, said printed matter having a pattern;

scanning means for reading at least first and second sections of said printed matter and for generating a signal for each said section representing the portion of said pattern in said respective section, said sections divided from each other in a direction substantially, orthogonal to said predetermined direction of conveyance;

operating means, connected to said scanning means for effecting operations between said signals generated by said scanning means and for generating at least one operating signal; and identifying means, connected to said operating means, for identifying said printed matter.

According to the present invention, as described above a printed matter identifying device can be provided wherein a printed matter is divided in a plurality of sections in a direction orthogonal to a direction to be conveyed, operations between the read-out signals from the respective sections and many printed patterns are identified by comparing the operated signals with the reference signals in order to identify, for example the type of printed matter or the authenticity of the printed matter.

BRIEF DESCRIPTION OF THE DRAWINGS

Other objects and features of the present invention will be apparent from the following description taken in connection with the accompanying drawings, in which.

DETAILED DESCRIPTION OF THE PREFERRED EMBODIMENTS

Figure 1A:
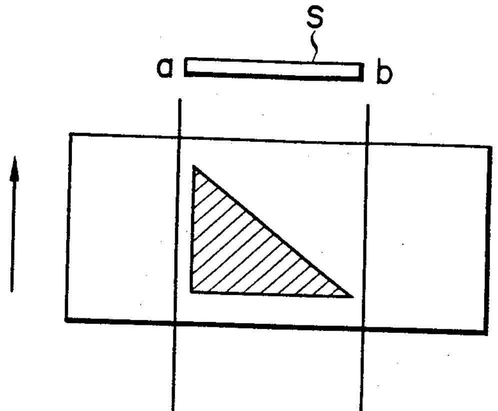
FIGS. 1(A) and 1(B) are diagrams showing a prior art apparatus for identifying patterns of printed matter.
Figure 1B:
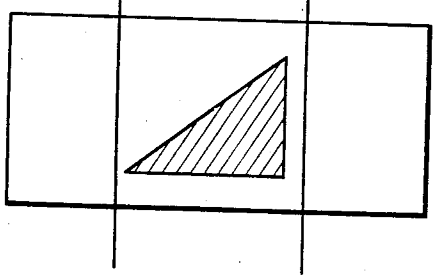
Figure 2A:
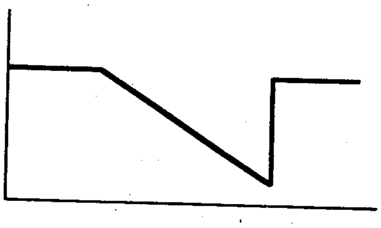
FIGS. 2(A) and 2(B) show waveforms read out from the patterns of FIG. 1.
Figure 2B:
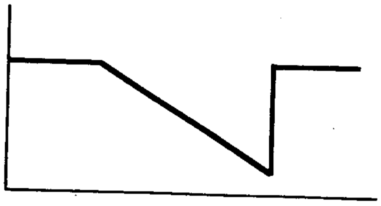
Figure 3:
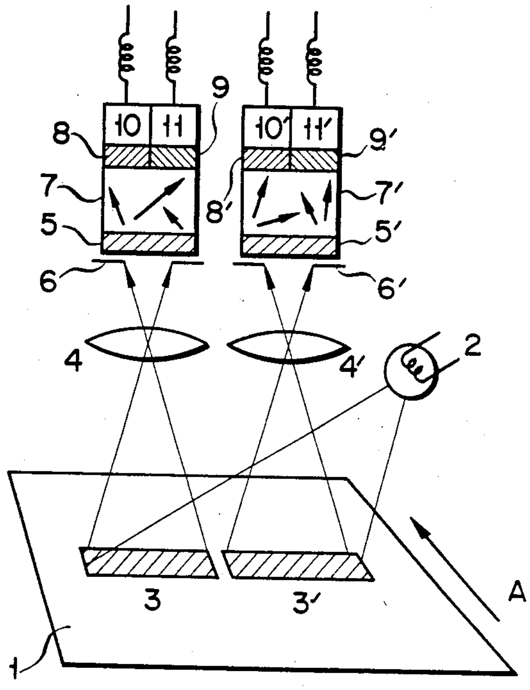
FIG. 3 is a perspective view showing one embodiment of an identifying device of the present invention.

Referring now to the drawings, wherein like reference numerals designated identical or corresponding parts throughout the several views, and more particularly to FIG. 3 thereof, the construction of a note identification device is shown. In the Figure, the device includes a means for dividing the reflected light from the note, in the direction orthogonal to the conveyance direction of the note, into two sections and a receiving means for detecting the reflected light from each of the respective sections of the printed pattern. In FIG. 3, the note 1 is conveyed by a conventional conveying means (not shown), such as the belt driven roller type or any other type well known to those skilled in the art, in the direction A. The central portion of the note 1 is effectively divided into two detecting fields 3 and 3′, by separating reflected light-waves from the pattern of the note 1 which are received as having different wavelengths. That is, the light source 2 illuminates the detecting fields 3 and 3′ of the note 1. As the note is conveyed, the pattern of the note 1 in each detecting field is scanned. The reflected light-waves from the detecting fields form images on the diffusion plates 5 and 5′, respectively, by way of the focusing lenses 4 and 4′, respectively. The front of each of the diffusion plates 5 and 5′ is provided with the slits 6 and 6′. The slits 6 and 6′ limit the size of the patterns which are formed on the diffusion plates 5 and 5′. The rear of each of the diffusion plates 5 and 5′ is provided with the light conducting paths 7 and 7′ having mirrored inner sides. The light conducting paths 7 and 7′ direct the light-waves which pass through the diffusion plates 5 and 5′ to the light receivers 10, 11 and 10′, 11′, such as photodiodes or other such devices well known in the art through color glass filters 8, 9 and 8′, 9′, respectively. The numerals 8 and 8′ denote red color transmitting filters and the numerals 9 and 9′ denote blue color transmitting filters. The light receivers 10 and 10′ receive only the red component of the reflected light-waves and the light receivers 11 and 11′ receive only the blue component of the reflected light-waves from the detecting fields 3 and 3′. The signals 12, 12′, 13 and 13′ from the light receivers 10, 10′, 11 and 11′, respectively, are amplified by respective amplifiers and are fed to a signal processing section as the signals R, B, R′ and B′. The sampling circuits 14, 15, 16 and 17 each comprising a sample and hold circuit connected to the output of the respective amplifiers and an analog to digital converter connected to the output of a respective sample and hold circuit shown in FIG. 4, effect sampling of the photoelectric signals representing the red color components 12 and 12′ and blue components 13 and 13′ of the respective reflected light-waves from the detecting fields 3 and 3′, and produce the respective sampled signals 18, 19, 18′ and 19′. If the pattern in FIG. 5(A) is green and the pattern in FIG. 5(B) is blue, the difference signal, representing the difference between the photoelectric signal of the red component of the reflected light-waves from each of the detecting fields 3 and 3′, is effective for identifying the patterns in FIGS. 5(A) and 5(B). If the pattern in FIG. 5(D) is green and the pattern in FIG. 5(C) is red, the sum signal, representing the sum of the photoelectric signal of the blue component of the reflected light-waves from each of the detecting fields 3 and 3′, is effective for identifying the patterns in FIGS. 5(C) and 5(D). Therefore, the patterns in FIGS. 5(A), 5(B), 5(C) and 5(D) may be identified by the difference signal of the red components and the sum signal of the blue components.

Referring again to FIG. 4B, the subtracter 20 calculates the difference between the sampled signals 18 and 18′ represented as photoelectric signal of the red component of the reflected light-waves detecting field 3 and 3′, respectively, and produces the difference signal 22. Also, the adder 21 computes the sum of the sampled signals 19 and 19′ represented as the photoelectric signal of the blue component of the reflected light-waves from the detecting fields 3 and 3′ respectively, and produces the sum signal 23. The subtracter 20 and the adder 21 perform their respective operation in synchronism with a control signal P.

Furthermore, the storage section 24, such as a ROM or RAM, stores the red component difference signal and the blue component sum signal obtained from each pattern of the predetermined reference notes (in this example, patterns shown in FIGS. 5(A) through 5(D)) and produces the respective reference signals 25 and 26.

The comparator 27 compares the difference signal 22 with each of the reference difference signals 25 and the comparator 28 compares the sum signal 23 with each of the reference sum signals 26 to verify which reference pattern that the detected pattern resembles. In the verifying operation, the pattern matching is effected between the sampled signal of the detected pattern and the reference signal to compute the similarity. A similarity value for each of the respective reference patterns from the comparators 27 and 28 is fed to a judgment section 29. The judgment section 29 determines if the sampled signal matches any of the reference signals and produces a signal representing the result of the determination. Thus identification of the note 1 is effected, and if a note does not include a pattern which matches any of the reference patterns, it is processed as a counterfeit note. It should be understood that the judgment section could be incorporated in a microprocessor with at least the comparators 27 and 28 or could be provided as software for a general purpose computer and operate according to the flow chart shown in FIG. 7 which will be explained more fully hereinafter.

Figures 5A, 5B, 5C, 5D:
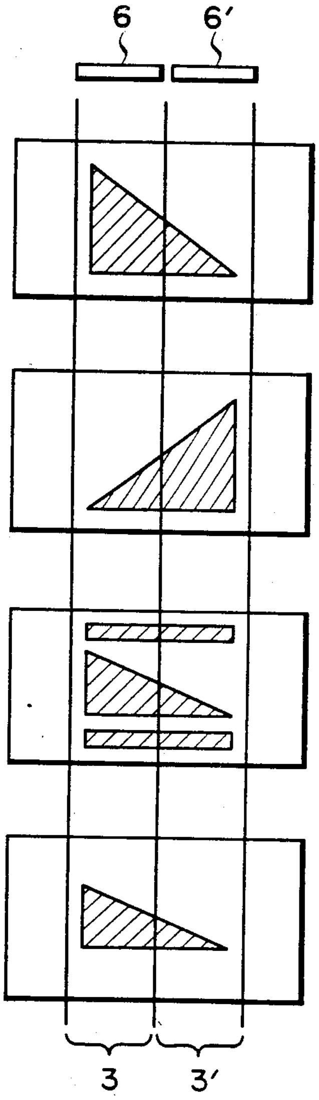
FIGS. 5(A) through 5(D) illustrate reference patterns.
Figure 6A:
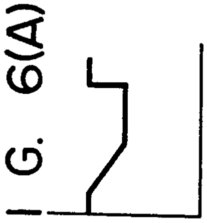
FIGS. 6(A) through 6(P) illustrate waveforms for the patterns in FIGS. 5(A) through 5(D)
Figure 6B:
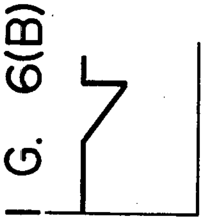
Figure 6C:
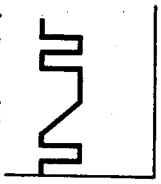
Figure 6D:
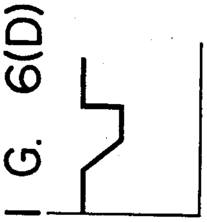
Figure 6E:
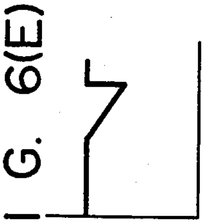
Figure 6F:
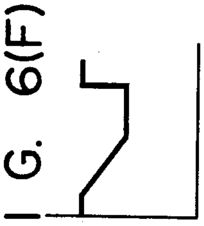
Figure 6G:
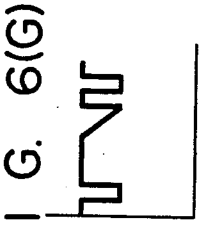
Figure 6H:
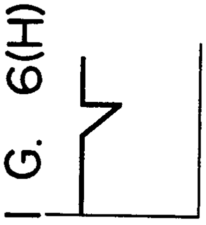
Figure 6I:
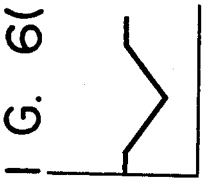
Figure 6J:
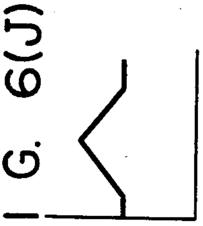
Figure 6K:
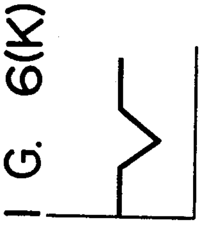
Figure 6L:
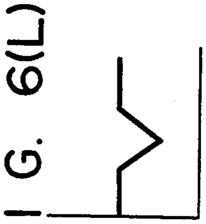
Figure 6M:
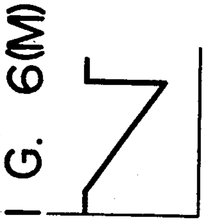
Figure 6N:
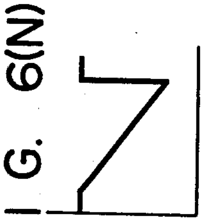
Figure 6O:
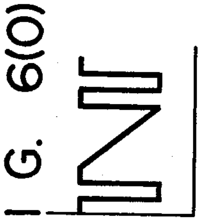
Figure 6P:
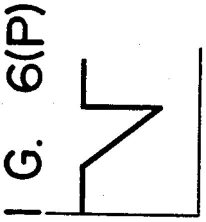
Figure 7:
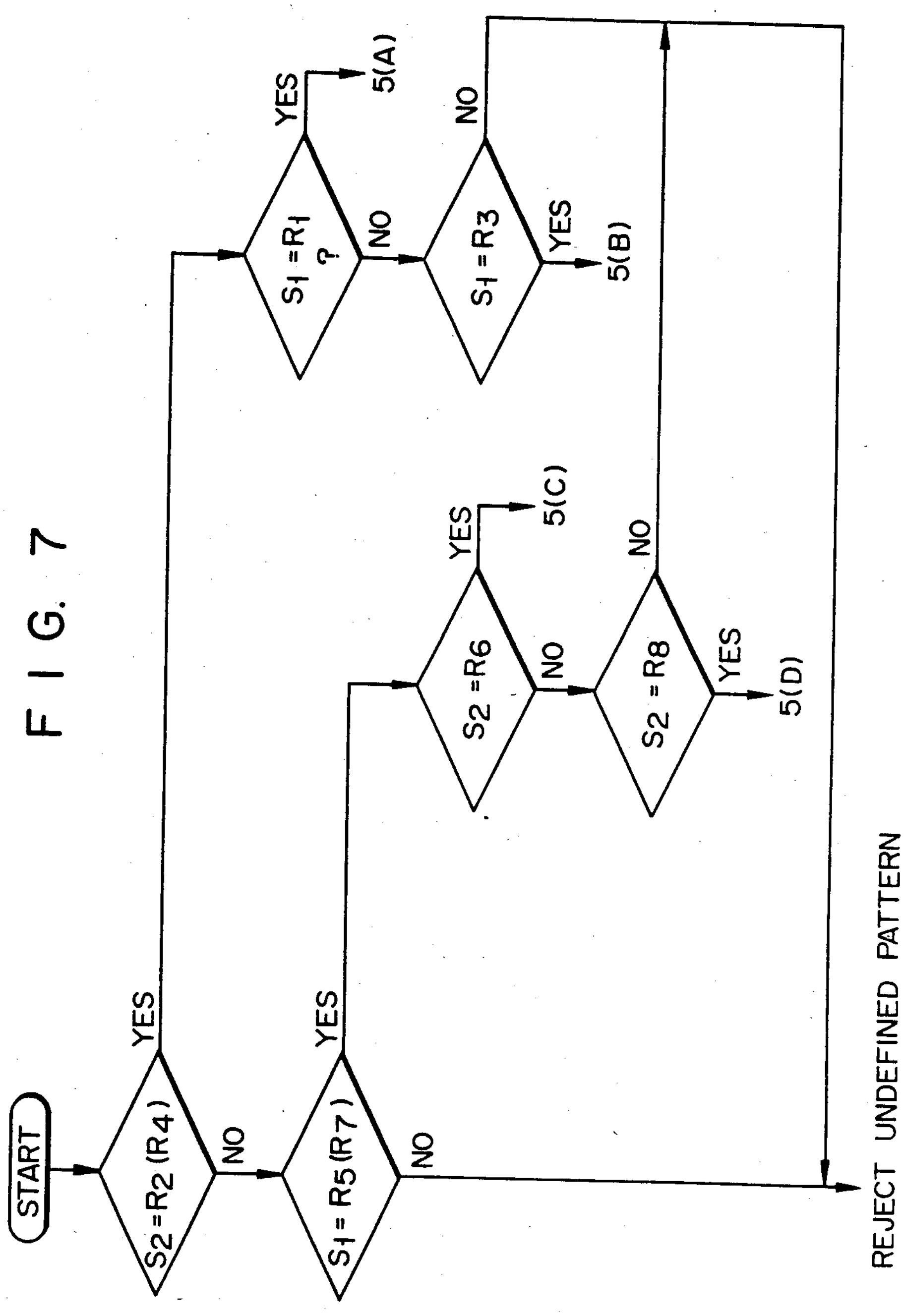
FIG. 7 is a flow chart for the judgment section of the present invention.
Figure 8:
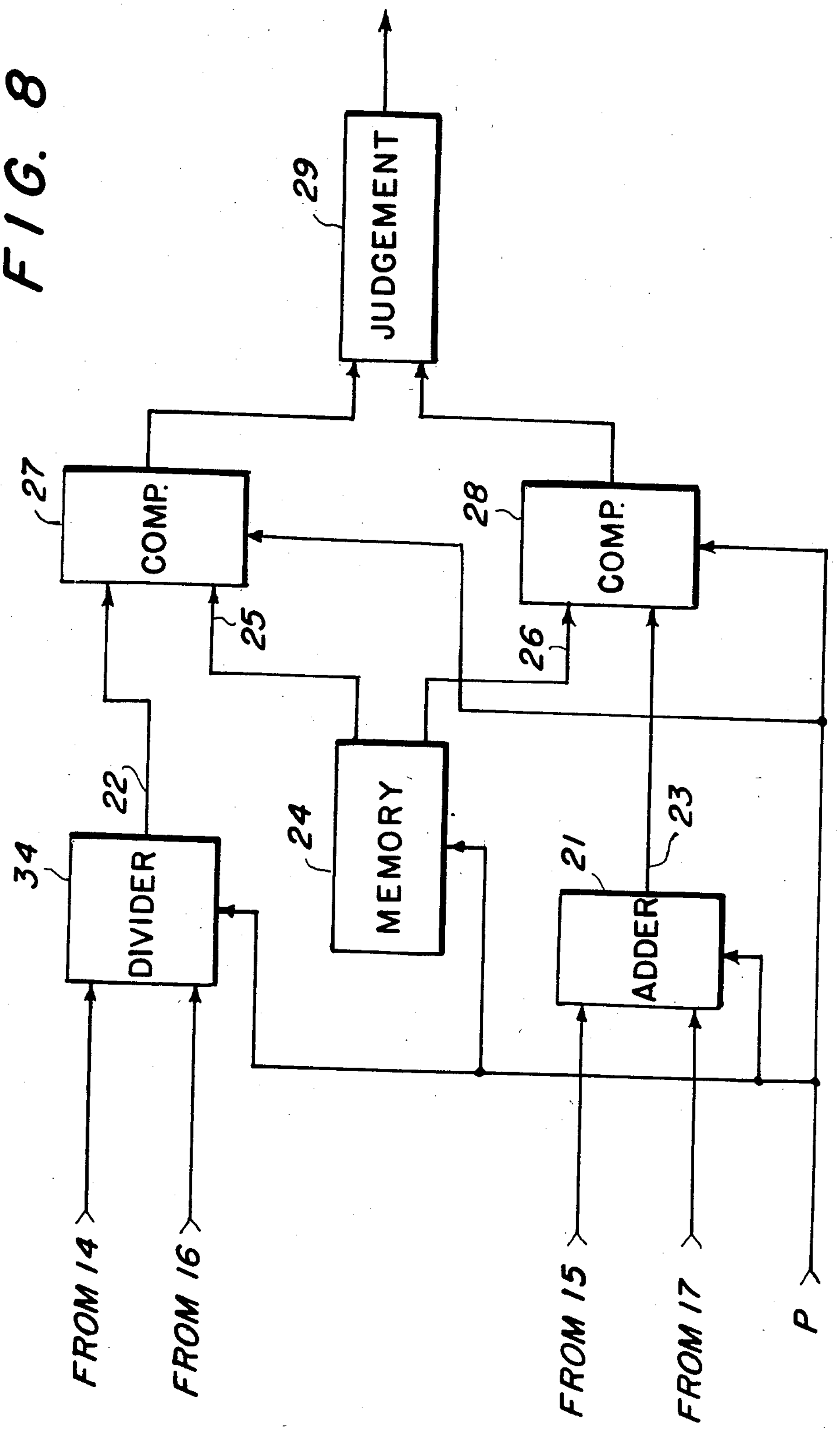
FIG. 8 shows another embodiment of the invention in block diagram form.
Figure 9:
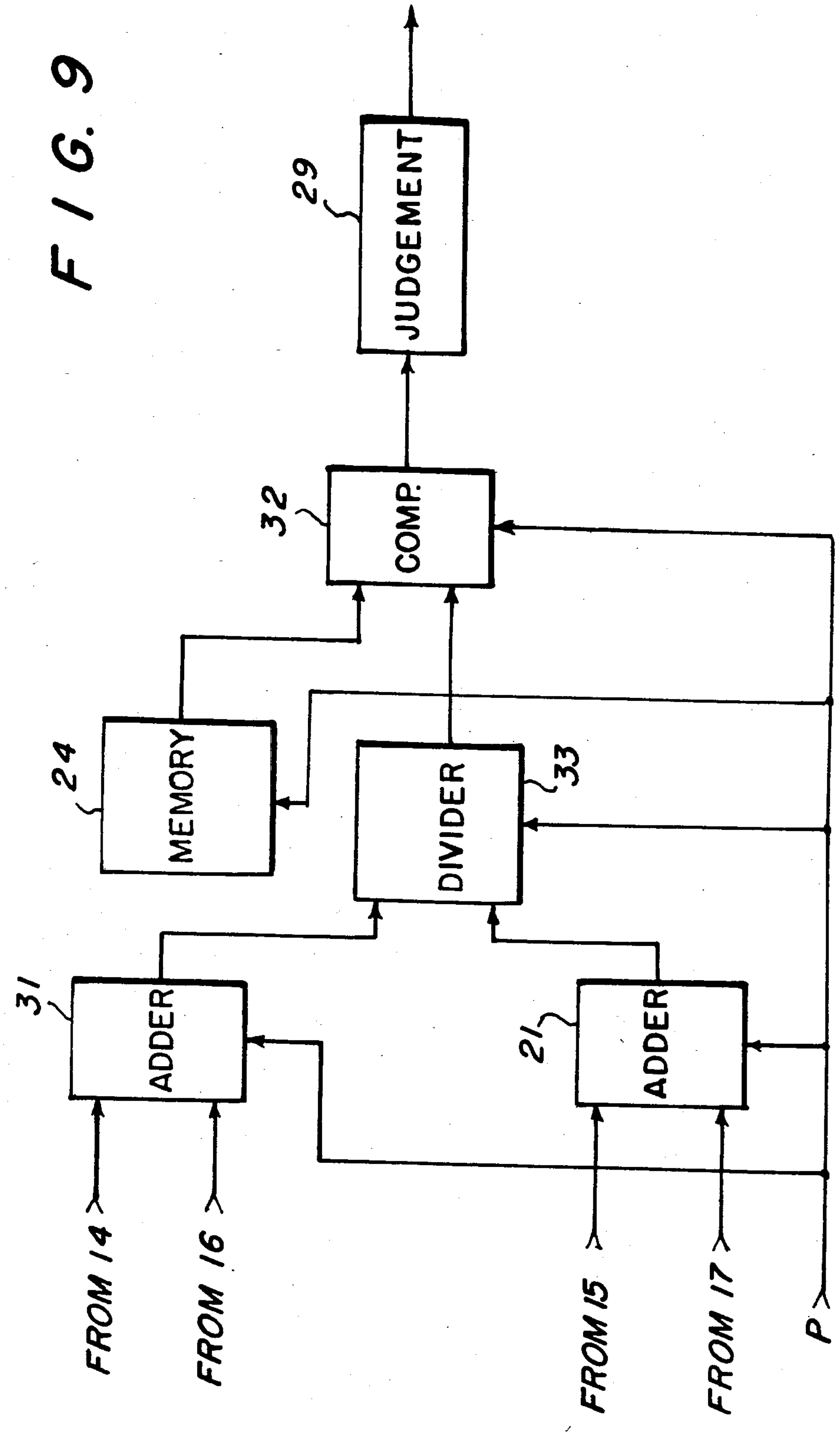
FIG. 9 shows still another embodiment of the invention in block diagram form.

Referring now to FIGS. 5, 6 and 7 the operation of the device will be explained. FIGS. 5(A) through 5(D) represent the reference patterns for comparison with the sampled patterns. FIGS. 6(A) and 6(E) represent for instance, the red component signals which would be read out from the detecting fields 3 and 3′ for the pattern of FIG. 5(A). FIG. 6(I) represents the red component difference signal obtained by subtracting the signal of FIG. 6(E) from the signal of FIG. 6(A). Similarly, the blue component signals (not shown) which should be read out from the detecting fields 3 and 3″ are added together to obtain the blue component signal shown in FIG. 6(M). FIGS. 6(B) and 6(F) represent the red component signals for the detecting fields 3 and 3″, respectively, of FIG. 5(B).

FIG. 6(J) represents the red component difference signal and FIG. 6(N) represents the blue component sum signal for the reference pattern in FIG. 5(B). FIGS. 6(C) and 6(G) represent the red component signals for the detecting fields 3 and 3′, respectively, of the FIG. 5(C). FIG. 6(K) represents the red component difference signal and FIG. 6(O) represents the blue component sum signal for the reference pattern in FIG. 5(C). FIGS. 6(D) and 6(H) represent the red component signals for the detecting fields 3 and 3′, respectively, of FIG. 5(D). FIG. 6(L) represents the red component difference signal and FIG. 6(P) represents the blue component sum signal for the reference pattern of FIG. 5(D).

Figure 4A:
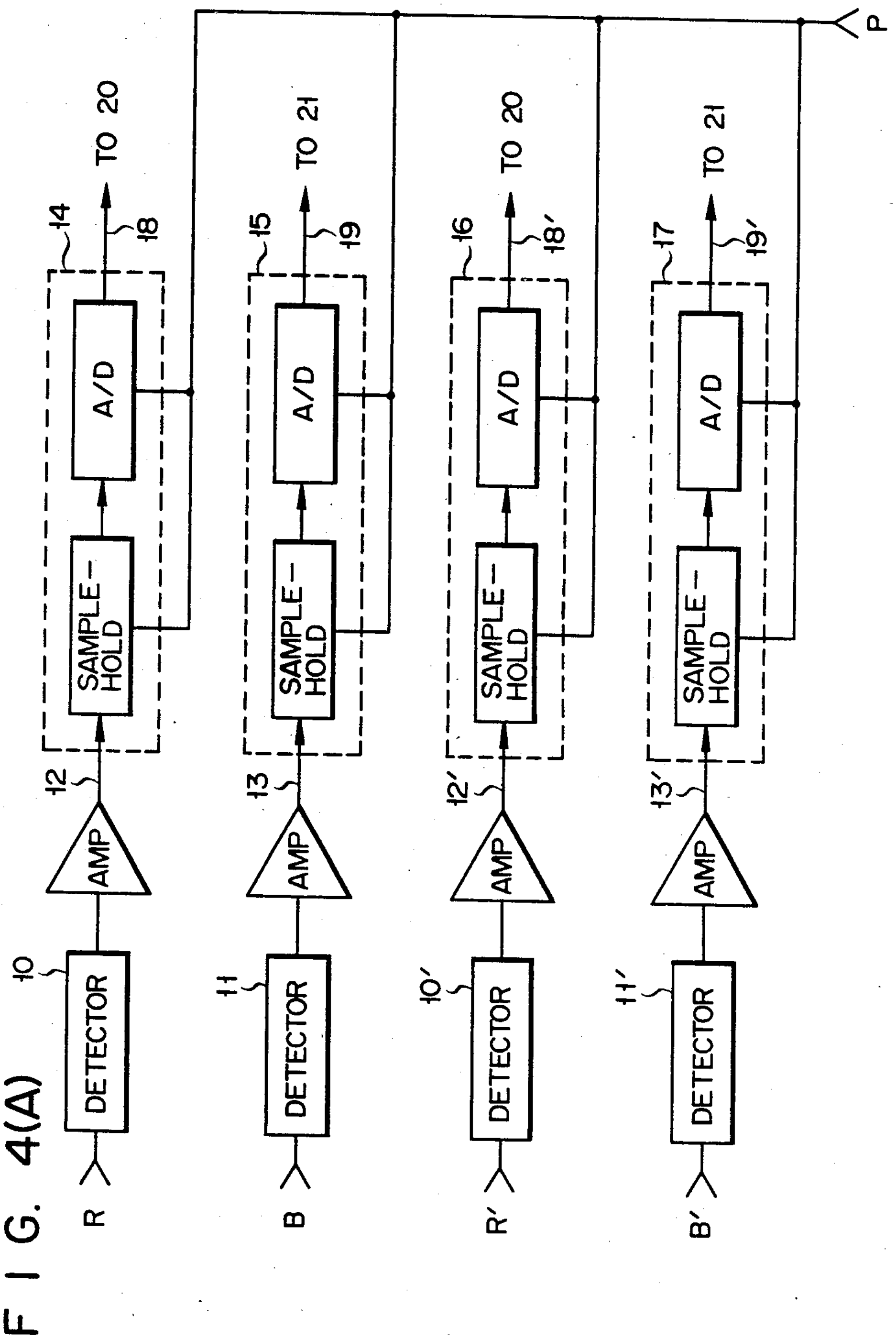
FIGS. 4A and 4B are block diagrams of the device of FIG. 3 for processing signals.
Figure 4B:
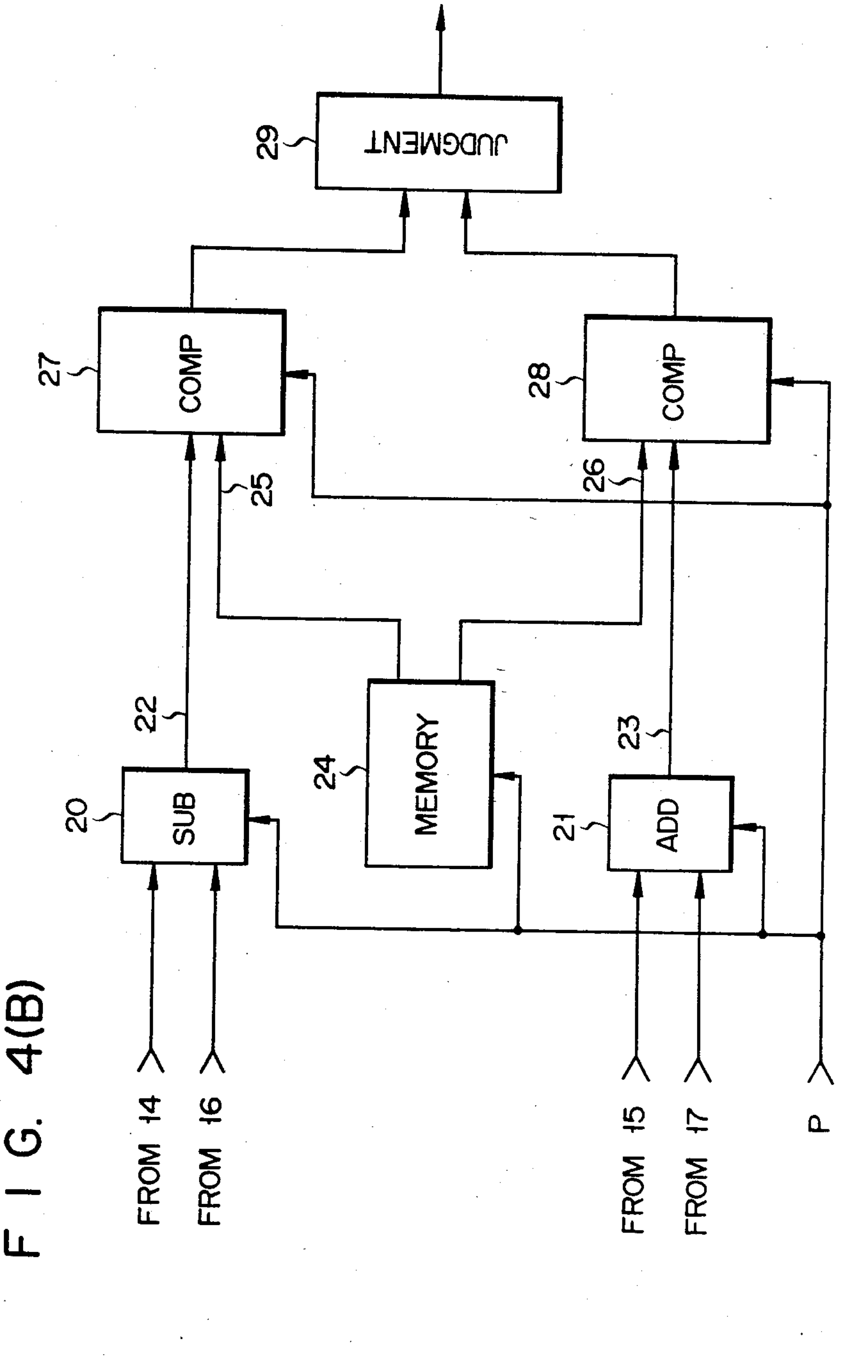

Therefore, an unknown note is scanned, as shown in FIG. 3, to obtain a sampled red component difference signal 22 and a sampled blue component signal 23 which are compared to the reference red component difference signals and the reference blue component sum signals, respectively, stored in the storage section 24 as explained in the description of FIG. 4. Once the comparison of the sampled signals to the reference signals is made, the judgment section determines if the sampled pattern matches any of the reference patterns according to the flow chart of FIG. 7. In the following explanation, the sampled red component difference signal is defined as S1, the sample blue component sum signal is defined as S2, the reference signals of FIGS. 6(I) and 6(M) are defined as R1 and R2 respectively; the signal of FIGS. 6(J) and 6(N) are defined as R3 and R4, respectively; the signals of FIGS. 6(K) and 6(O) are defined as R5 and R6, respectively; and the signals of FIGS. 6(L) and 6(P) are defined as R7 and R8, respectively.

If the sampled blue component sum signal S2 is equivalent to signal R2 or signal R4, the sampled red component difference signals is checked. If S1 is equivalent to R1, the sampled pattern is equivalent to the reference pattern of FIG. 5(A). However, if S1 is not equivalent to R1, but is equivalent to R3, the sampled pattern is equivalent to the reference pattern of FIG. 5(B). Further, if S1 is not equivalent to R1 or R3, the sampled pattern (note) is rejected as undefined.

If S2 is not equivalent to R2 or R4, S1 is checked against R5 and R7. If S1 is equivalent to R5 or R7, S2 is checked. If S2 is equivalent to R6, then the sampled pattern is equivalent to the reference pattern of FIG. 5(C). However, if S2 is not equivalent to R6, but is equivalent to R8, the sampled pattern is equivalent to the reference pattern of FIG. 5(D). Further, if S2 is not equivalent to R6 or R8, the sampled pattern (note) is rejected as undefined.

Therefore, using the above-mentioned method, the sampled patterns can be easily identified and verified.

It should be understood that color separation may be omitted if the patterns to be sampled are clearly identifyable and in that case only one color is used. Further, the color separation is not limited to red and blue and the color filter can be changed according to the color of the note.

Color separation of more than two colors is also easily accomplished with the present invention.

In another embodiment, a sampled red component ratio signal represented by the sampled red component signal from detecting field 3 divided by the sampled red component from detecting field 3' can be compared to reference red component ratio signals, instead of using the difference signals. Therefore, the subtracter 20 would simply be replaced with a divider. This method proves beneficial because a more stabilized sampled signal can be achieved, even when the signals from the detecting fields are varied because of soiled notes, for instance.

In still another embodiment, the sampled red component can be added to form a sampled red component sum signal in order to determine the ratio between the blue component sum signal and the red component sum signal, again using a divider. Therefore, the sampled blue-red ratio signal from the divider 33 is compared to reference blue-red ratio signals. Of course a second adder would be provided to sum the sampled red component signals from the detecting fields and a divider provided to determine the sampled blue-red ratio signal. This embodiment increases the reliability of the device for identification.

Further, the identifying device according to the present invention is not limited only to notes, but to any printed matter in which the contents of the operations, the variations of colors and the detecting fields are arbitrarily selectable according to the patterns of the printed matter, colors and other such parameters.

This invention is also applicable to readings from magnetic media, which for purposes of this invention will also be considered or defined as printed matter.

Obviously, numerous (additional) modifications and variations of the present invention are possible in light of the above teachings. It is therefore to be understood that within the scope of the appended claims, the invention may be practiced otherwise than as specifically described herein.

What we claim is:

1. A method for identifying printed matter comprising the steps of:

conveying printed matter having a pattern through a lighted conveying path in a predetermined direction;

filtering light-waves transmitted from at least two sections of said printed matter, said sections divided from each other in a direction substantially orthogonal to said predetermined direction of conveyance;

photoelectrically converting said filtered light-waves from each said section to produce at least first and second electric signals;

combining said first and second electric signals in a first manner to produce a first operating signal;

combining said first and second electric signals in a second manner, which differs from said first manner, to produce a second operating signal;

comparing said first and second operating signals with first and second reference signals obtained from a reference pattern; and judging whether said pattern of said conveyed printed matter is equivalent to said reference pattern from the results of said comparing step.

2. A printed matter identifying apparatus, comprising:

conveying means for conveying printed matter through a lighted conveying path in a predetermined direction, said printed matter having a pattern;

scanning means for reading at least first and second sections of said printed matter and for generating at least one signal for each said section representing a portion of said pattern, said sections divided from each other in a direction substantially orthogonal to said predetermined direction of conveyance, said scanning means comprising at least first and second filter means, said first filter means being for filtering predetermined wavelengths of light-waves transmitted from said first section and said second filter means being for filtering predetermined wavelengths of light-waves transmitted from said second section, and at least first and second photoelectric conversion means in optical communication with said first and second filter means, respectively, said first photoelectric conversion means for converting said light-waves transmitted through said first filter means into a first electric signal and said second photoelectric conversion means for converting said light-waves transmitted through said second filter means into a second electric signal;

operating means, connected to said scanning means, for effecting operations between said signals generated by said scanning means, said operating means comprising a subtracter, connected to said first and second photoelectric conversion means, for combining said first and second electric signals to produce a first operating signal and an adder, connected to said first and second photoelectric conversion means, for combining said first and second electric signals to produce a second operating signal; and identifying means, connected to said operating means, for identifying said printed matter in accordance with said first and second operating signals.

3. A printed matter identifying apparatus according to claim 2, wherein said identifying means including storage means for storing at least one reference signal from at least one reference pattern, comparator means, connected to said operating means and said storage means for comparing said sampled signal to said reference signal, said judgment means, connected to said comparator means, for determining whether said pattern is equivalent to at least one reference pattern based on the results from said comparator means.

4. A printed matter identifying apparatus according to claim 2, wherein said identifying means includes storage means for storing at least first and second reference signals from at least one reference pattern, first comparator means, connected to said operating means and said storage means, for comparing said first operating signal to said first reference signal, second comparator means, connected to said operating means and said storage means, for comparing said second operating signal to said second reference signal, and judgment means for determining whether said pattern is equivalent to at least said one reference pattern based in the results from said first and second comparator means.

5. An apparatus according to claim 2, wherein said identifying means is a microprocessor.

6. An apparatus according to claim 2, wherein said scanning means reads a pattern residing on magnetic media.

7. A printed matter identifying apparatus, comprising:

conveying means for conveying printed matter through a lighted conveying path in a predetermined direction, said printed matter having a pattern;

scanning means for reading at least first and second sections of said printed matter and for generating at least one signal for each said section representing a portion of said pattern, said sections divided from each other in a direction substantially orthogonal to said predetermined direction of conveyance, said scanning means comprising at least first and second filter means, said first filter means being for filtering predetermined wavelengths of light-waves transmitted from said first section and said second filter means being for filtering predetermined wavelengths of light-waves transmitted from said second section, and at least first and second photoelectric conversion means in optical communication with said first and second filter means, respectively, said first photoelectric conversion means for converting said light-waves transmitted through said first filter means into a first electric signal and said second photoelectric conversion means for converting said light-waves transmitted through said second filter means into a second electric signal;

operating means, connected to said scanning means, for effecting operations between said signals generated by said scanning means and for generating at least one operating signal, said operating means comprising a divider, connected to said first and second photoelectric conversion means, for combining said first and second electric signals to produce a first operating signal and an adder, connected to said first and second photoelectric conversion means, for combining said first and second electric signals to produce a second operating signal; and identifying means, connected to said operating means, for identifying said printed matter in accordance with said first and second operating signals.

8. A printed matter identifying apparatus according to claim 7, wherein said identifying means comprises: storage means for storing at least one reference signal from at least one reference pattern; comparator means, connected to said operating means and said storage means, for comparing said operating signals to said reference signal, and judgment means, connected to said comparator means, for determining whether said pattern is equivalent to said at least one reference pattern based on the results from said comparator means.

9. A printed matter identifying apparatus according to claim 7, wherein said identifying means comprises: storage means for storing at least first and second reference signals from at least one reference pattern; first comparator means, connected to said operating means and said storage means, for comparing said first operating signal to said first reference signal; second comparator means, connected to said operating means and said storage means, for comparing said second operating signal to said second reference signal; and judgment means for determining whether said pattern is equivalent to said at least one reference pattern based on the results from said first and second comparator means.

10. An apparatus according to claim 7, wherein said scanning means reads a pattern residing on magnetic media.

11. An apparatus according to claim 7, wherein said identifying means is a microprocessor.

12. A printed matter identifying apparatus, comprising:

conveying means for conveying printed matter through a lighted conveying path in a predetermined direction, said printed matter having a pattern;

scanning means for reading at least first and second sections of said printed matter and for generating at least one signal for each said section representing a portion of said pattern, said sections divided from each other in a direction substantially orthogonal to said predetermined direction or conveyance, said scanning means comprising at least first and second filter means, said first filter means being for filtering at least two predetermined wavelengths of light-waves transmitted from said first section and said second filter means being for filtering said at least two predetermined wavelengths of light-waves transmitted from said second section, and at least first and second photoelectric conversion means in optical communication with said first and second filter means, respectively, said first photoelectric conversion means for converting said light-waves transmitted through said first filter means into first and second electric signals and said second photoelectric conversion means for converting said light-waves transmitted through said second filter means into third and fourth electric signals;

operating means, connected to said scanning means, for effecting operations between said signals generating by said scanning means, said operating means comprising a first adder connected to said first and second photoelectric conversion means, for combining said first and third electric signals to produce a first operating signal, a second adder, connected to said first and second photoelectric conversion means, for combining said second and fourth electric signals to produce a second operating signal, and a divider for combining said first and second operating signals to produce a third operating signal; and identifying means, connected to said operating means, for identifying said printed matter in accordance with said third operating signal.

13. A printed matter identifying apparatus according to claim 12, wherein said identifying means comprises: storage means for storing at least one reference signal from at least one reference pattern; comparator means, connected to said operating means and said storage means, for comparing said third operating signal to said reference signal, and judgment means, connected to said comparator means, for determining whether said pattern is equivalent to at least one reference pattern based on the results from said comparator means.

14. An apparatus according to claim 12, wherein said scanning means reads a pattern residing on magnetic media.

15. An apparatus according to claim 12, wherein said identifying means is a microprocessor.

* * * * *